March 12, 1963    C. W. COWLEY ETAL    3,080,725
METHOD AND APPARATUS FOR CONTROLLED RATE COOLING
AND WARMING OF BIOLOGICAL SUBSTANCES
Filed Aug. 11, 1960    4 Sheets-Sheet 3

INVENTORS
CLEMENT W. COWLEY
ARTHUR P. RINFRET
JOSEPH A. SAWDYE
BY William H. Mesinger
ATTORNEY

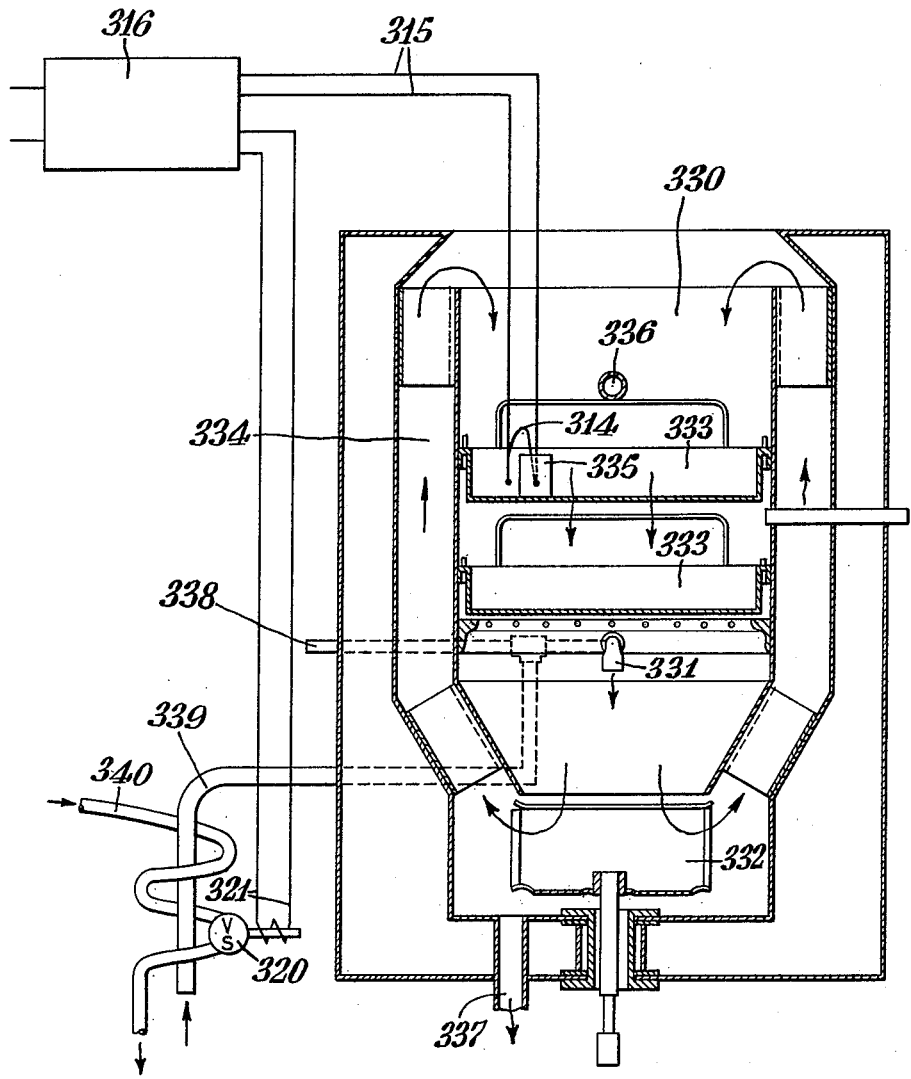

United States Patent Office 3,080,725
Patented Mar. 12, 1963

3,080,725
METHOD AND APPARATUS FOR CONTROLLED RATE COOLING AND WARMING OF BIOLOGICAL SUBSTANCES
Clement W. Cowley, Tonawanda, Arthur P. Rinfret, Buffalo, and Joseph A. Sawdye, North Tonawanda, N.Y., assignors to Union Carbide Corporation, a corporation of New York
Filed Aug. 11, 1960, Ser. No. 48,964
14 Claims. (Cl. 62—62)

This invention relates to a method of and apparatus for thermally treating biological substances and more specifically to the cooling, freezing and thawing of such substances at controlled rates.

In order to preserve biological material such as blood at low temperatures, such material must first be cooled to a certain critical temperature, usually about −50° C., within a certain period of time or at a certain rate. If a metallic container is immersed in liquid nitrogen or a mixture of carbon dioxide and methyl Cellosolve, it will cool in the temperature range from 0° C. to −50° C. at a rate of from 200° C. to 400° C. per minute. If the metallic container is insulated, cooling rates up to 12,000° C. per minute are possible. However, where very slow cooling rates, such as 1–10° C. per minute, are required, the prior art has not provided completely satisfactory systems.

In the art of refrigeration, a number of methods have been used to produce the desired low temperatures in articles. Such methods entail the use of ice water and where a temperature below the freezing point of water is required, a salt is mixed with the ice water to attain the required low temperatures, or the use of solidified carbon dioxide gas and placing of such material in contact with or adjacent to the substance to be refrigerated, or the use of sealer containers of frozen brine, commonly known as "cold cans," the containers being likewise placed in contact with or adjacent to the article. Another commonly employed method is that of extracting heat from the article by mechanical means operating in the vicinity of the article.

Still another method of refrigeration utilizes liquid air as a refrigerant, a supply of the liquid air being placed in a receptacle in a chamber with the preservable substance followed by regulating the flow of liquid air through the chamber, or vaporizing and circulating the liquid air about the material, or immersing the materials in the liquid refrigerant bath. None of these methods contemplate the control of the chilling rate of the articles. A commercially available slow-cooling apparatus utilizes an alcohol bath and a pumping system. The sample to be chilled, when approximately at room temperature, is immersed in an alcohol bath also at room temperature. When it is desired to start cooling, the pumping system is actuated and cold alcohol at about −78° C. is pumped into and mixed with the warm alcohol bath. The rate of cooling is set at about 1° C. per minute. This is accomplished by controlling the rate at which the cold alcohol is pumped into the warm alcohol. It should be understood that the chilling rate referred to with this prior art apparatus is the rate at which the bath is lowered in temperature and not necessarily the rate at which the sample is lowered in temperature. The versatility of this apparatus is extremely limited and the rate at which the sample is cooled through any particular temperature region is not monitored or controlled.

It is an object of this invention to provide improved process and apparatus for cooling and freezing of biological substances at controlled rates.

Still another object is to provide a system for thawing frozen biological substances at controllable rates.

A further object of this invention is to provide an apparatus for recirculation of refrigerant fluid plus make-up refrigerant which results in improved refrigerant economy.

It is a further object of this invention to provide an apparatus for chilling biological substances with wide adaptability and versatility in controllable cooling rates.

Further objects of this invention will be apparent from the following detailed description of specific embodiments of the invention, and the appended claims.

Referring to the drawings forming part of this specification and illustrating preferred embodiments of this invention:

FIG. 4 is a cross-section view taken in elevation of another apparatus constructed in accordance with this invention.

Wherever possible, similar items in the various figures have been identified by similar reference numbers differing by 100 or multiples thereof.

Figure 1:
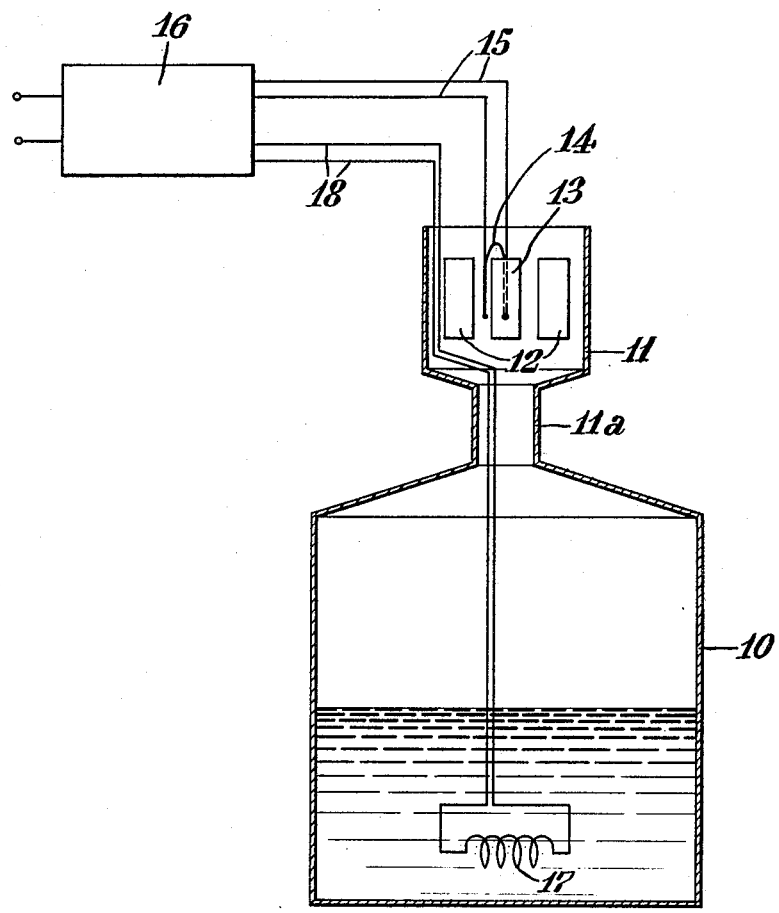
FIG. 1 is a cross-section view with parts in elevation of apparatus according to the present invention.

The chilling of substances at controlled rates is achieved by utilizing the refrigerating properties of a gas stream at or near the liquefaction temperature of such gas. The rate of chilling is controlled by maintaining a constant, predetermined temperature differential between the substance to be chilled and the gas stream. This is achieved by controlling the evaporation rate of a low-boiling liquefied gas by means of a temperature sensing device coupled through a manually preset or programmed controller to a heating device.

Controlled rate warming is achieved by the installation of a heat exchanger which preferably provides warm gases from an external source, the gases being introduced into the system as make-up gases when desired. The heat exchanger is actuated by a suitable signal from the temperature controller and the cold and warm gases may be blended in any desired proportion to suit a particular temperature requirement.

Liquid nitrogen is the preferred liquefied gas although other fluids boiling below about −161° C. are suitable for practicing this invention as for example oxygen, argon and helium.

Due to the rapidly increasing amount of scientific experimentation to determine the optimum conditions for the low temperature preservation of such biological material as bone marrow, it is desirable to provide cooling and warming systems having a wide adaptability and versatility. For example, it should be possible to vary the cooling rate of the substance over as wide a range as possible, both in the liquid state and in the frozen state. It is of course necessary to know what the cooling rate should be.

A preferred apparatus of this invention cools a batch or batches of a given substance at a desired and preset rate as measured by degrees of temperature drop per unit time, by maintaining a specific temperature difference between the substance sample or a dummy sample and the cold refrigerant gas flowing past the sample. This apparatus operates as follows: a liquefied gas container, having one opening which is connected to the cooling chamber into which is placed the bath to be cooled, is used as the source of refrigeration. The cooling chamber may be insulated, if desired or necessary. A relatively cold gas stream, resulting from the vaporization of the liquefied gas, is passed through the cooling chamber or thermal treating zone in heat exchange relationship with the substance. For the purpose of vaporizing the liquefied gas, any suitable heating device may be either immersed in the liquefied gas or attached to the liquefied gas container. However, a heating or vaporizing device comprising sparging or bubbling warm gas through the liquid to be vaporized and thus effecting the heat transfer is not suitable for the following reasons:

(1) The heat content of a gas is quite low as compared to the latent heat of vaporization of the liquid; hence, relatively large amounts of the energy-carrier gas would be required for vaporization, the resulting mixture being only at a slightly lower temperature than the energy-carrier gas prior to contact with the liquid to be vaporized.

(2) The control system of the present invention would be unsuitable, since the temperature difference between the incoming and outgoing gases is an inverse function of the total amount of gas vaporized.

In the practice of this invention, the dummy sample consists of a representative container with the contents and temperature identical to that of the samples. A differential thermocouple is placed with one leg in the dummy sample and the other leg in the gas stream in close proximity to the sample container. This second leg of the thermocouple measures the ambient gas temperature. The inside wall of the container is preferred for the location of the thermocouple because of the thermally easily reproducible position; however, any other location within the bulk of the sample can be used. The dummy sample may also contain some standard liquid such as water, the freezing rate of the biological substance having been calibrated against the standard sample. The sample containers may be made out of any material having suitable sanitary, thermal and corrosion-resistive properties; for example, aluminum, polyethylene or phenoxy plastics, glass and the like. The output of the differential temperature sensing device is fed to the input side of a temperature controller while the heater control is fed to the load side of the temperature controller. The controller is then adjusted to maintain a specific temperature differential between the inside of the biological sample and the cold refrigerant gas flowing past the sample. As the temperature differential drops below the desired value, the controller turns on the heater, the result being a greater rate of evaporation of the liquid refrigerant which, in turn, causes a greater flow of cold gas past the sample until the temperature differential again reaches the desired value. At this point, the controller switches the heater off. The greater the temperature differential, the greater will be the cooling rate.

Instead of one predetermined cooling rate, a series of cooling rates on a given biological sample can also be effected with this apparatus by preparing a program of the desired sequence and cooling rates and using the program in conjunction with a suitable program controller.

Actual cooling rates in the present cooling device may be varied by one of several methods including the following: (1) Varying the temperature differential, (2) varying the heater input, either of an immersed heater or a heater in the cooling chamber, or both, (3) varying the size and geometry of the biological samples, (4) changing the configuration of the cooling chamber, and (5) varying the refrigerant gas flow rate in the cooling chamber.

An important feature of the present apparatus is that the cooling chamber configuration must be such that the gas flow is uniform around all the biological samples. A nearly flat velocity profile is desirable for the gas stream, that is, the cooling rate experienced by the dummy sample must be representative of all the samples. Baffles or other flow modifying devices may be used to obtain more uniform cooling rates and a suitable means for agitating the samples can also be used to obtain a more uniform chilling rate and to avoid supercooling.

If aqueous solutions are to be chilled from room temperature to approximately −50° C., the maximum chilling capacity, in terms of grams of pure water, is between 30 and 40 grams of water per liter of refrigerant, using liquid nitrogen as the liquefied gas. The capacity of the equipment using other suitable refrigerants is approximately the same since the heat contents of these gases are approximately the same as nitrogen.

In FIG. 1, a liquid nitrogen container 10 is employed as the source of refrigeration. The cooling chamber 11 is in direct physical and gas flow communication with container 10 by means of throat section 11a. The samples 12 are suspended in the cooling chamber with sufficient space provided so that a uniform flow of cold gas can pass around all of the samples resulting in substantially equal cooling rates of these samples. A dummy sample 13 may be suspended in the cooling chamber 11 to provide for adequate thermal control of the cooling and freezing sequence. One leg of a differential thermocouple 14 is placed inside the dummy sample 13 while the other leg is situated in the gas space in close proximity to the dummy sample. The output signal from this differential thermocouple is transmitted by electrical connections 15 to the controller 16. The cold gas flow is provided by vapor generated by electric heater 17 immersed in the liquid nitrogen inside the container 10. This heater 17 is connected to the controller 16 by electrical connections 18 in such a manner that it is switched on and off as the differential thermocouple output requires, maintaining a preset temperature differential between the outside gas and the inside of the dummy biological sample.

Figure 2:
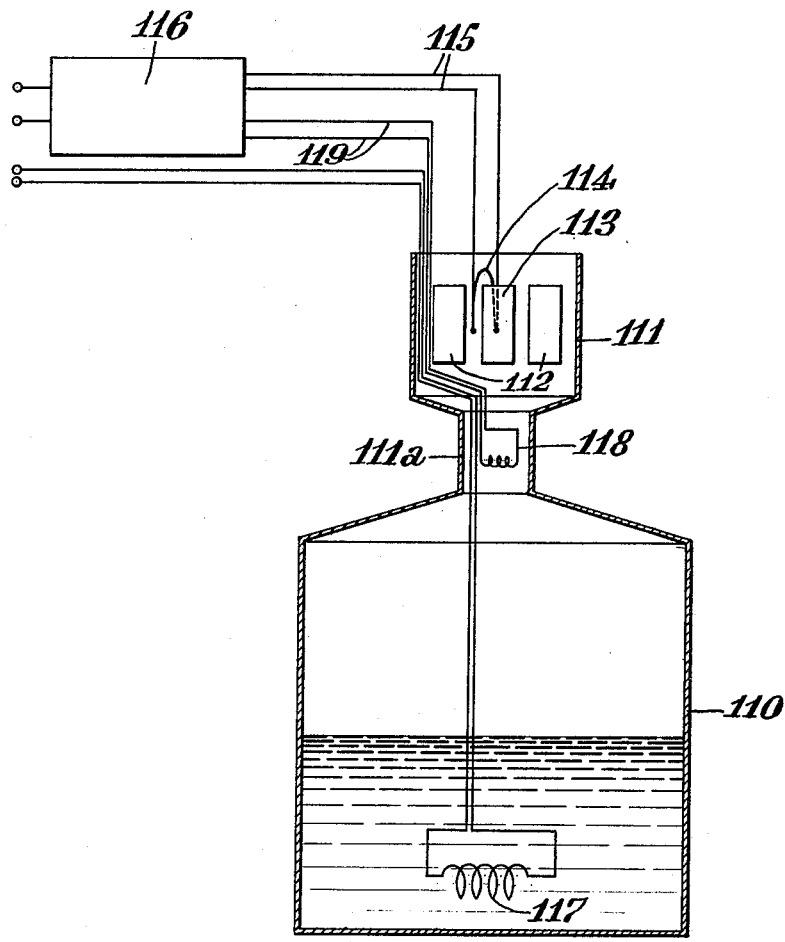
FIG. 2 is a view of apparatus similar to that illustrated in FIG. 1 but modified in certain particulars.

Other arrangements of the present apparatus are contemplated such as that illustrated in FIG. 2 wherein a constant vapor boil-off rate is provided by connecting heater 117 to a power source and placing a second heater 118 in the throat 111a of the cooling chamber 111 to further heat the rising vapor if necessary. This second heater may be connected to the controller 116 by electrical connections 119 and operated by the differential thermocouple 114 to maintain the required temperature differential. In this manner, the vaporizing heat is supplied by the immersed heater and at least part of the superheat may be provided by the throat heater. Alternatively, the immersed heater 117 may be connected to the controller 16 in order to provide a constant heat input to the heater in the cooling chamber 111.

The cooling chamber can be separated from the source of refrigeration by a flexible tubing or other suitable means, thus allowing for greater adaptability and versatility of the apparatus. Here again, the control may be provided by an immersed heater actuated by the controller, or a second heater in the cooling chamber actuated by the controller, with the power input to the first heater being constant, or a combination of both.

Figure 3:
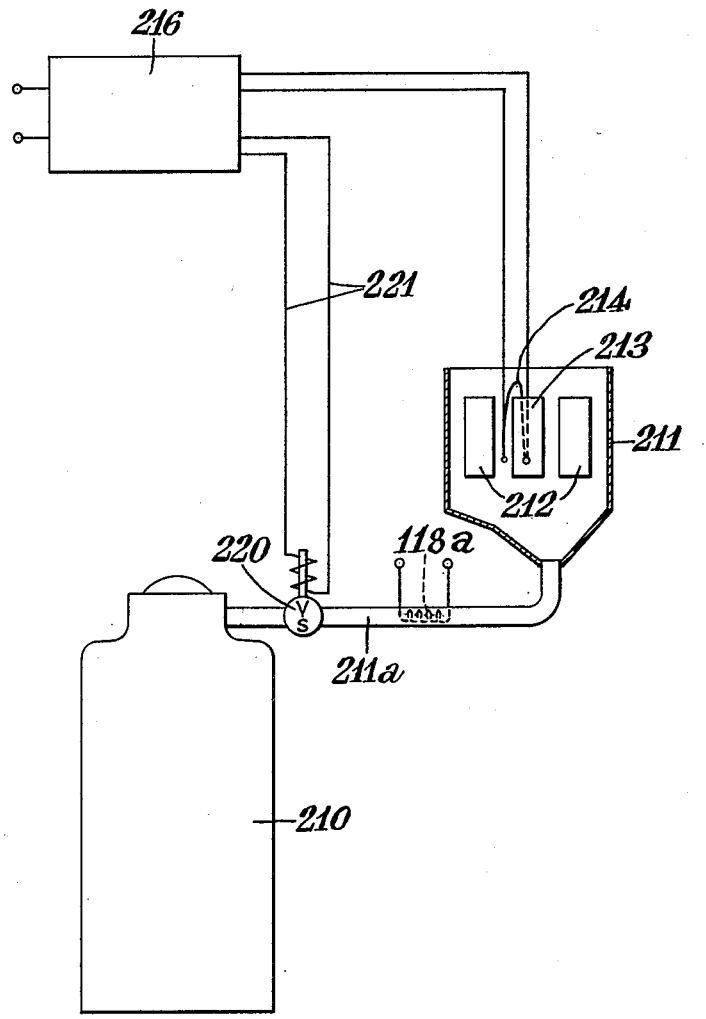
FIG. 3 is a view of apparatus also similar to FIG. 1 but differing in certain details.

As a further variation in the invention, the cooling chamber and the liquefied gas container may be connected by a passageway containing an electrically operated, e.g. solenoid valve, see FIG. 3. Liquefied gas container 210 may for example store pressurized liquid nitrogen which is discharged through passageway 211a to cooling chamber 211 as a gas. Passageway 211a contains solenoid valve 220 which is preferably actuated by controller 216 through electrical connections 221 and in response to the output signal from differential thermocouple 214 in a manner similar to the FIGS. 1 and 2 systems. The liquid nitrogen from container 210 is preferably vaporized in passageway 211a by atmospheric heat, although a warmer fluid such as steam could alternatively be circulated around the passageway. Alternatively, heater 118a may be provided in passageway 211a to effect such vaporization, or may be used to superheat the vapor. In any event, the refrigerant should be completely vaporized before entering the cooling chamber as direct contact between the liquid and the biological substance may have a detrimental effect on the latter. The FIG. 3 embodiment has an advantage over the previously discussed FIG. 1 and 2 forms in that a far greater supply of liquid nitrogen is available, allowing for the cooling of a greater number of samples.

Any well-insulated container of any capacity may be used to provide the liquefied gas and while not essential, it may be convenient or desirable to provide a temperature recorder so that a continuous recording of the temperature in the dummy sample is obtained. In this manner, a record is obtained of the actual cooling rate experienced by the biological samples.

The basic elements of another embodiment of this invention are:

(A) An insulated chamber in which cooling and warming of the biological substance at controlled rates is accomplished, the chamber being provided with suitable fixtures for holding the substance during processing;

(B) A solenoid-valve-controlled gas injection system for the introduction of cold gas for cooling, warm gas for warming, or both cold and warm gas alternately for either process;

(C) A suitable control system to regulate the rate of gas introduction and circulation so as to achieve a desired cooling or warming rate; and (D) A centrifugal fan which circulates the refrigerant gas to achieve most efficient utilization of the refrigerant and also so as to reduce thermal gradients within the cooling chamber.

In this embodiment the refrigerant in the form of a liquefied gas spray or cold vapors is introduced into the cooling chamber under pressure through a solenoid-controlled valve. The refrigerant is introduced on the suction side of a centrifugal fan which is located near the bottom of the cooling chamber. The fan then circulates the cold gas in a closed cycle upwardly through an outer annulus and then downwardly through the cooling chamber, past the point of injection and again into the suction side of the fan. As the cold gas flows downwardly through the cooling chamber, it flows over the vials containing the biological substance to be chilled or warmed. The temperature of the gas stream is controlled by means of a differential thermocouple control system which maintains a constant, preset temperature difference between the gas stream and a dummy sample containing suitable temperature sensing means. The dummy sample is located in the cooling chamber along with other samples. The temperature controller regulates the chamber temperature by suitably adjusting the flow of make-up refrigerant or warm gas into the chamber. The controller also activates the heat exchanger providing the warm gas supply.

The fan is employed in the cooling chamber, preferably near the bottom, for purposes of improving the heat transfer coefficient between the circulating gases and the samples, obviating undesirable temperature gradients within the cooling chamber, and providing an effective means of recirculating the chamber atmosphere to the extent desired. The make-up cooling or warming fluids are introduced on the suction side of the fan. The deleterious effects of liquid refrigerant spray have been successfully eliminated by directing the introduced refrigerant at the suction side of the recirculating fan. In this manner, the uneven contact of small, extremely cold refrigerant droplets with the samples to be cooled is avoided.

Recirculation of the chamber atmosphere gas is effectively achieved by providing an annular passageway around the chamber into which the gas is exhausted by the fan. The exhausted gases then reenter the chamber from the top by suitable deflecting means.

Rapid recooling and rewarming of the chamber is effectively achieved by the provision of switches, the closing of which shorts out the controller and automatically opens the solenoid valves regulating the refrigerant and warming-fluid flows.

FIG. 4 shows the relationship of the various components of this embodiment. The refrigerant and/or warm gas is introduced into the cooling chamber 330 through nozzle 331. A centrifugal fan 332 is located near the bottom of the cooling chamber 330. Two specimen racks 333 are shown in the cooling chamber. Fan 332 circulates the refrigerant or warming gas upwardly through an annular passageway 334 and thence downwardly into the cooling chamber 330 and in contiguous relationship with the specimens 335 held in racks 333. The gas circulation pattern is essentially as shown by the arrows. An exhaust vent 336 and a drain 337 are also provided. Refrigerant fluid enters through conduit 338 and warm gas through conduit 339. The temperature difference between sample 335 and the circulating warm gas stream is sensed by thermocouple 314 and transmitted by conduit 315 to controller 316. The latter in turn sends signals through conduit 321 to actuate valve 320 in heating conduit 340 coiled around gas conduit 339. In this manner the heat input to the gas in conduit 339 is controlled in response to the sensed temperature differential.

Apparatus was constructed in accordance with this invention in which liquid nitrogen was evaporated using an electric heater in a container. The resulting cold vapor was passed from the container upwardly through a 1⅜ inch I.D. aluminum tube enlarged by a conical section at the mouth of the liquid nitrogen container to an inside diameter of 4⅞ inches, where the sample was suspended from a support rod. The evaporation rate was controlled by a differential thermocouple sensing the temperature in the sample on the inside wall of the container and in the cold gas stream in the conical section. This differential temperature reading was transmitted to a circular chart controller. A particular cooling rate was obtained by setting the controller to maintain a specific temperature difference between the relatively cold vapor stream and the sample as sensed by the differential thermocouple. The controller maintained this temperature difference by controlling the liquid nitrogen evaporation rate by regulating the power input to the heater. The actual temperature difference was the setting on the controller less room temperature. A thermocouple situated in the center of the sample measured the sample temperature which, in turn, was recorded on a strip chart recorder. The sample studied consisted of water placed in a cylindrical aluminum container having an internal diameter of 17 mm. The experimental results are illustrated in the following table, all runs using 25 cc. of water as the sample fluid.

SUMMARY OF EXPERIMENTAL RUNS USING WATER

| Setting, °C. | | Chilling Time (min.) | | | Rate of Chill | | | |
|---|---|---|---|---|---|---|---|---|
| Actual Differential Setting | Differential Setting On Instrument | Init. Liq. Temp. to Heat of Fusion | Heat of Fusion | Solid to −50°F. | Total Time | Liquid, °C./min. | Solid, °C./min. | Total, °C./min. |
| 5 | b30 | 37.1 | 16.2 | 60.0 | 113.3 | 0.51 | 0.77 | 1.03 |
| 15 | 40 | 23.3 | 50 | 20.8 | 94.1 | 1.05 | 2.14 | 0.72 |
| 25 | 50 | 16.7 | 31.7 | 13.3 | 61.7 | 1.47 | 3.55 | 1.13 |
| 55 | 80 | 10.0 | 20.0 | 7.8 | 37.8 | 3.6 | 6.05 | 2.2 |
| 55 | 80 | 5.7 | 19.8 | a4.5 | 30.0 | 3.4 | 8.4 | 1.91 |
| 65 | 90 | 2.2 | 5.5 | 4.5 | 12.2 | 6.2 | 10.0 | 3.8 | a Solid to −30° F. only.
b Adjusted differential during heat of fusion.

The cooling rates were varied from 0.5° C. per minute to 6.2° C. per minute in the liquid state and from 0.8° C. up to 10° C. per minute in the solid state as the temperature differential was increased from 5° C. to 65° C. These figures, however, do not represent the total range which would be available for such a controlled rate freezer. A change in the size of the heater, a change in the geometry of the container, or a change in the design of the cooling chamber could substantially broaden this range and it is believed that cooling rates from as low as about 0.1° up to 20° C. per minute are easily obtainable, with even a further extension of the operable temperature range being possible.

The following specific examples will further illustrate and clarify the invention.

*Example I.—Chilling of Bovine Semen*

Bovine semen having about 60% motility was frozen in 1 cc. aliquots by the present method using a controlled-rate cooling and warming unit similar to that illustrated in FIG. 4. Five samples were frozen simultaneously and nine cooling rates were used ranging from 1.6° C. per minute to 37° C. per minute in the temperature range from −10° C. to −20° C. The average motility of the frozen and thawed samples was about 50%.

*Example II.—Controlled-Rate Chilling of Tissue Cultures*

L-strain mouse fibroblasts and Hela (human) cells suspended in a glycerol-containing media were chilled at cooling rates of 1° C. per minute and 25° C. per minute over a temperature range between 0° C. and −50° C. with a controlled-rate cooling and warming unit similar to the FIG. 1 and FIG. 4 embodiment.

About 98% viability of the frozen and thawed cells was obtained as indicated by Trypan blue staining. Growth and metabolism tests by serial dilution indicated that the viability was equivalent to that of unfrozen cells.

*Example III.—Controlled Chilling of Tissue Cells*

Epithelial cells such as Hela cells, intestine cells, heart cells, and mouse fibroblasts were chilled at a rate of about 1° C. per minute in the temperature range between 0° C. and −50° C. by using a controlled-rate cooling device similar to the FIG. 1 and FIG. 4 apparatus.

A viability of about 98% was obtained with epithelial cells and a viability of about 70% was obtained with the fibroblasts.

It will be obvious to those skilled in the art that our invention is capable of various modifications, and we do not desire therefore, to be restricted to the precise details shown and described.

What is claimed is:

1. Apparatus for controllably warming biological substances comprising, in combination, a warming chamber having support means for said biological substance, means for supplying a gas stream, heat exchange means for warming said gas stream, means for introducing the warmed gas stream to said chamber, a fan for circulating the warm gas in intimate contact in heat exchange relationship with the biological substance, means for sensing the temperature difference between the warming biological substance and the circulating gas stream, and means responsive to the sensed temperature for controlling the rate of heat input to said heat exchange means and the rate of warmed gas stream introduction to said chamber.

2. A method for thermally treating biological substance comprising providing said substance in a thermal treating zone; providing a gas stream having a temperature different than said substance and contacting said thermal treating zone with said gas stream in heat exchange relationship with said substance; continuously sensing the temperature differential between said substance and said gas stream; and maintaining a predetermined temperature differential between said gas stream and said substance so as to control the rate of heat exchange between said substance and said gas stream.

3. A method of cooling biological substance according to claim 2, wherein said substance is cooled by heat exchange with a gas stream derived from a gas material having a normal atmospheric boiling point below about −161° C.

4. A method of thermally treating biological substance comprising providing said substance in a thermal treating zone; introducing a gas stream into such zone and forcibly circulating the same in said zone in heat exchange relationship with said substance; continuously sensing the temperature differential between said substance and said gas stream; and maintaining a predetermined temperature differential between said gas stream and said substance so as to control the rate of heat exchange between said substance and said gas stream.

5. A method according to claim 4 wherein said gas stream is derived from a body of liquid nitrogen.

6. A method as defined in claim 4 including the step of providing a body of liquefied gas and controllably vaporizing a portion thereof in response to the temperature of said substance so as to form said gas stream.

7. A method as defined in claim 4 including the steps of providing a body of liquefied gas and controllably vaporizing a portion thereof in response to the temperature of said substance so as to form said gas stream and controllably further heating said gas stream.

8. A method of heating biological substance at controlled rates according to claim 2 comprising providing a gas stream and controllably heating said gas stream so as to provide a warm gas and passing said warm gas in heat exchange relationship in accordance with the steps hereinbefore set forth.

9. Apparatus for cooling biological substance comprising, in combination, a vessel containing a liquefied gas body; means for controllably vaporizing portions of said liquefied gas body in response to the temperature of said substance; cooling chamber means having support means for said biological substance permitting cooling of such substance by the liquefied gas vapor; means for introducing such vaporized portion as a gas stream into such chamber and passing the same in heat exchange relationship with said substance; means for continuously sensing the temperature differential between said biological substance and said gas stream; and means for maintaining a predetermined temperature differential between said gas stream and said substance so as to control the rate of heat exchange between said substance and said gas stream.

10. Apparatus as defined in claim 9 wherein a heater immersed in the liquefied gas constitutes the vaporizing means; thermocouples comprise the temperature difference sensing means; and a controller having signal receiving means communicating with said thermocouple, and actuating means communicating with the immersed heater being responsive to the thermocouple signals constitute said means for controlling the heating of fluid.

11. Apparatus as defined in claim 9 wherein a first heater immersed in the liquefied gas body constitutes the vaporizing means; a second heater is provided in said opening between said vessel and said cooling chamber means; thermocouples comprise the temperature difference sensing means; and a controller having signal receiving means communicating with said thermocouples, and actuating means communicating with said second heater being responsive to the thermocouple signals constitutes said means for controlling the heating of fluid.

12. Apparatus for thermally treating biological substance comprising, in combination, a container having a thermal treating chamber therein; support means positioned within such chamber for said biological substance; means for providing a gas stream having a temperature different than said substance and conducting said gas stream through said chamber in heat exchange relationship with said substance; means for continuously sensing the temperature differential between said substance and said gas stream; and means for maintaining a predetermined temperature differential between said gas stream and said material so as to control the rate of heat exchange between said substance and said gas stream.

13. Apparatus according to claim 12 including means for forcibly circulating said gas stream in said chamber.

14. Apparatus according to claim 12 including a vessel containing a liquefied gas body; and wherein the means for introducing said gas stream provides liquid communication between said vessel and said chamber; and including means for passing said gas stream in heat exchange relationship with said substance such that said gas stream is substantially completely vaporized prior to such heat exchange.

References Cited in the file of this patent
UNITED STATES PATENTS

| | | |
|---|---|---|
| 927,595 | Place | July 13, 1909 |
| 2,195,924 | Hoesel | Apr. 2, 1940 |
| 2,236,058 | Henney | Mar. 25, 1941 |
| 2,479,867 | Rosebaugh | Aug. 23, 1949 |
| 2,706,895 | Thompson et al. | Apr. 26, 1955 |
| 2,720,088 | Hailey | Oct. 11, 1955 |
| 2,831,329 | Morrison | Apr. 22, 1958 |
| 2,951,351 | Snelling | Sept. 6, 1960 |